US006460346B1

(12) United States Patent
Cleary

(10) Patent No.: US 6,460,346 B1
(45) Date of Patent: Oct. 8, 2002

(54) METHOD AND SYSTEM FOR IDENTIFYING MALFUNCTIONING COMBUSTION CHAMBERS IN A GAS TURBINE

(75) Inventor: Mark James Cleary, Powder Springs, GA (US)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 09/651,190

(22) Filed: Aug. 30, 2000

(51) Int. Cl.⁷ ................................................ F02C 7/00
(52) U.S. Cl. ........................................................ 60/779
(58) Field of Search ............................ 60/39.02, 39.03, 60/39.06, 39.33, 779, 803

(56) References Cited

U.S. PATENT DOCUMENTS 5,461,855 A * 10/1995 Inoue et al. ................ 60/39.06
5,878,566 A * 3/1999 Endo et al. ............... 60/39.281

FOREIGN PATENT DOCUMENTS

JP  56-92326  * 7/1981
JP  2-64232   * 8/1988  ................ 60/39.33

* cited by examiner

*Primary Examiner*—Louis J. Casaregola
(74) *Attorney, Agent, or Firm*—Nixon & Vanderhye P.C.

(57) ABSTRACT

A combustion chamber graphic analyzer (CCGA) computer software application has been developed for analyzing the performance of individual combustion chambers in an operating gas turbine. The CCGA identifies combustion chambers that are sustaining abnormally hot or cold combustion temperatures. The identification of hot or cold combustion chambers is graphically displayed by the CCGA on a computer display, printed report or other computer output. Whether a combustion chamber is operating hot or cold is determined based on a circumferential profile of the temperatures of the exhaust gases from the gas turbine. This circumferential temperature profile is rotated using a swirl angle to correlate the exhaust gas temperature profile with the circular array of combustion chambers.

15 Claims, 4 Drawing Sheets

METHOD AND SYSTEM FOR IDENTIFYING MALFUNCTIONING COMBUSTION CHAMBERS IN A GAS TURBINE

BACKGROUND OF THE INVENTION

This invention relates to the performance analysis of combustion chambers in a gas turbine. In particular, the invention relates to a computer software application for analyzing temperature differences between exhaust thermocouples which correspond to specific combustion chambers in an operating gas turbine.

As shown in FIG. 1, a gas turbine 10 has a combustion section 12 in a gas flow path between a compressor 14 and a turbine 16. The combustion section may include an annular array of combustion chambers 20, e.g., combustion cans. The turbine is coupled to rotationally drive the compressor and a power output drive shaft 18. Air enters the gas turbine and passes through the compressor. High pressure air from the compressor enters the combustion section where it is mixed with fuel and burned. High energy combustion gases exit the combustion section to power the turbine which, in turn, drives the compressor and the output power shaft 18. The combustion gases exit the turbine through the exhaust duct 19, which may include a heat recapture section to apply exhaust heat to preheat the inlet air to the compressor.

The combustion gases swirl partially around the axial centerline of the gas turbine, as the gases move axially through the turbine. This swirl of the combustion gases is due to the rotation of the turbine blades and of the compressor blades. The amount of swirl in the combustion gases between the combustion section 12 and exhaust ducts 19 depends on the operating condition of the gas turbine, such as its stage load, duty cycle, ambient temperature and other factors. When the combustion gases exit the exhaust duct, the gases have swirled about the axis of the gas turbine and are not axially aligned with the combustion chambers 20 that generated the gases.

A liquid and/or gaseous fuel supply 22, including piping, valves and controls, distributes fuel to each combustion chamber 20. The fuel flows to a fuel nozzles 24 at an upstream end of each of the chambers. Fuel is injected via the nozzles 24 into each chamber and mixes with compressed air flowing from the compressor. A combustion reaction of compressed air and fuel occurs in each chamber.

It is generally preferable to have uniform combustion reactions, e.g., at the same temperature, in each of the chambers. A uniform flow of combustion gases, e.g., common temperature, from all combustion chambers is desirable for optimal combustion performance and for uniformly powering the turbine 16. Hot combustion gases flow from the array of combustion chambers 20 to the rotating turbine 16. The combustion gases flowing from each individual combustion chamber mix with combustion gases exiting the other chambers to form a combined stream of hot gases exiting the turbine exhaust duct.

Non-uniformity in the flow of combustion gases, e.g., an excessively-hot or cold section of the gas flow, is indicative of a problem in the combustion section. Identifying a non-uniformity in the gas flow in the combustion section is difficult. The uniform flow of combustion gases and the swirling of gases from the different chambers effectively masks combustion problems occurring in one or more individual chambers 20. Specifically, if one combustion chamber is performing poorly, it is difficult to identify that chamber based on the exhaust gas flow and while the combustion section (and gas turbine) is operating. It would be useful to distinguish the combustion gases from one chamber from the gases of another chamber in order to diagnose problems in the combustion chambers.

A conventional technique for diagnosing combustion problems in a gas turbine is to shut down the gas turbine and physically inspect all of the combustion chambers. This inspection process is tedious and time-consuming. It requires that each of the combustion chambers be opened for inspection, even though most chambers are fine and require no maintenance. While this technique is effective in identifying problem combustion chambers, it is expensive in terms of lost power generation and of expensive repair costs. The power generation loss due to an unscheduled shut down of a gas turbine, especially those used in power generation utilities, is also costly and is to be avoided if at all possible. In addition, gas turbine shut-downs for combustion problems are generally lengthy because the problem is diagnosed after the gas turbine is shut down, cooled to a safe temperature and all chambers are inspected. There is a further delay in effecting repairs to obtain repair parts to fix the problem once the combustion problem is identified. Accordingly, combustion problems can force gas turbines to shut down for lengthy repairs.

There is a long-felt and unmet need for a reliable and accurate technique for identifying problem combustion chambers. Such a system would be preferably performed while the gas turbine is operating. Diagnosing a problem in a running combustion chamber would allow maintenance personnel to determine whether the gas turbine requires immediate shut-down, or if the repair may be delayed until the next scheduled maintenance shut-down. In addition, early diagnosis of combustion chamber problems would allow maintenance personnel to order repair parts prior to shut down, so that the parts are on hand when the combustion chamber is opened for repair. Repair of combustion chambers would be implemented quickly because the conventional delay of waiting for repair parts while the gas turbine is shut down is avoided. The present invention satisfies these needs.

BRIEF SUMMARY OF THE INVENTION

The present invention provides an analytical tool for quickly and accurately identifying combustion chamber problems in an operating gas turbine. A combustion chamber graphic analyzer (CCGA) software application has been developed that identifies problem combustion chambers (or a problem area within a single annular chamber) within an operating gas turbine. The CCGA collects data regarding the operation of a gas turbine, including the temperature of exhaust gases from the gas turbine. This data is analyzed by the CCGA to determine the relative performance of each combustion chamber. The CCGA produces reports, e.g., charts, that identify combustion chambers that are experiencing potential problems, such as abnormally hot or cold combustion reactions. Based on the relative performance of each chamber, service personnel can identify malfunctioning combustion chambers and take appropriate corrective action.

The CCGA may generate a chart or other graphical display showing the relative temperature distribution of each combustion chamber, such as by identifying which combustion chambers have relatively "hot" combustion temperatures and which chambers have relatively "cold" combustion temperatures. By reviewing this chart, service personnel may quickly determine whether one or more combustion chambers are operating excessively hot or cold and, thereby, identify chambers having operating difficulties. This determination is made while the gas turbine is operating.

The software application for the CCGA may run on a standard computer, e.g., personal computer, and may be implemented using an off-the-shelf spreadsheet program, such as Microsoft Excel™. A spreadsheet is used to implement the algorithms needed to convert operating data, such as turbine exhaust thermocouple array data, into a chart showing of the temperature distribution of the exhaust gases. In addition, linear algorithms for identifying excessive temperature differences within a combustion section may also be implemented in a spreadsheet program. An advantage of using a known spreadsheet software application as a platform on which to implement the CCGA algorithms is that the CCGA may run on many different types of computers, including personal and lap-top computers which are easily transported to individual gas turbines for analysis.

The CCGA system reduces the shut-down period during which a gas turbine is unavailable for producing power. The CCGA also reduces the instances in which gas turbines are shut down due to misdiagnosed combustion problems, and reduces the time required to repair the combustion problems when the gas turbine is shut down. Moreover, the CCGA identifies problem combustion chambers and avoids the prior need to inspect all chambers. Only problem chambers need to be opened and the other chambers can remain closed. By reducing the instances in which each chamber is inspected, fewer consumable parts, such as gaskets, are used during each inspection of the combustion section. Reducing the frequency of inspections of each chamber also minimizes the potential for damaging combustion parts during each inspection. Accordingly, the invention may reduce the cost and time needed to repair combustion chambers.

The CCGA system provides a reliable and quick analytical tool to determine the performance of the chambers in a combustion section of a gas turbine. The CCGA further provides an analytical tool that enables gas turbine service personnel to determine whether combustion chambers are operating with difficulties and whether those difficulties require the gas turbine to be shut down.

DETAILED DESCRIPTION OF THE INVENTION

Figure 1:
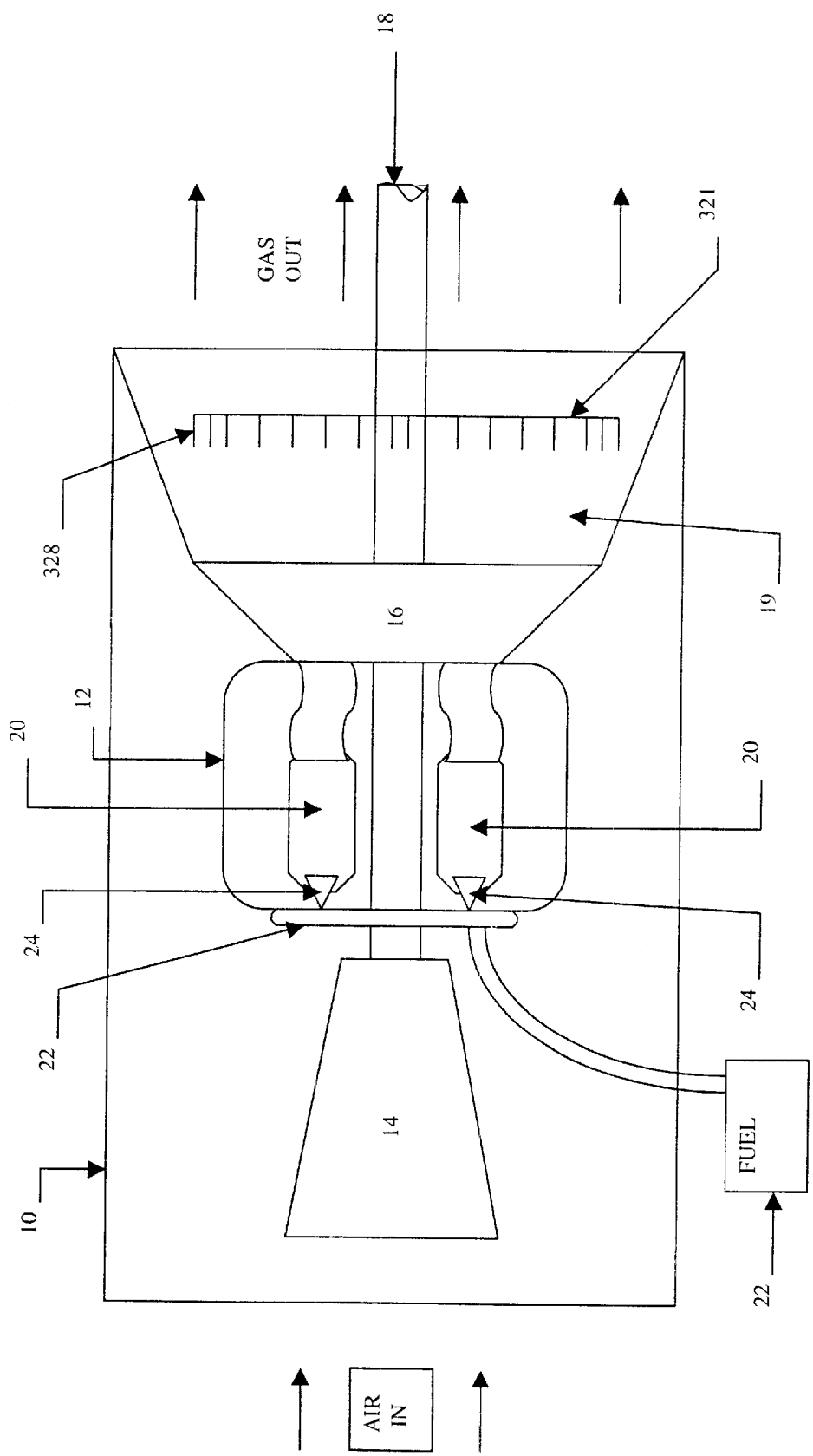
FIG. 1 a schematic diagram showing a gas turbine having sensors for monitoring its performance, and a computer system for analyzing sensor performance and generating information regarding combustion chamber performance.
Figure 2:
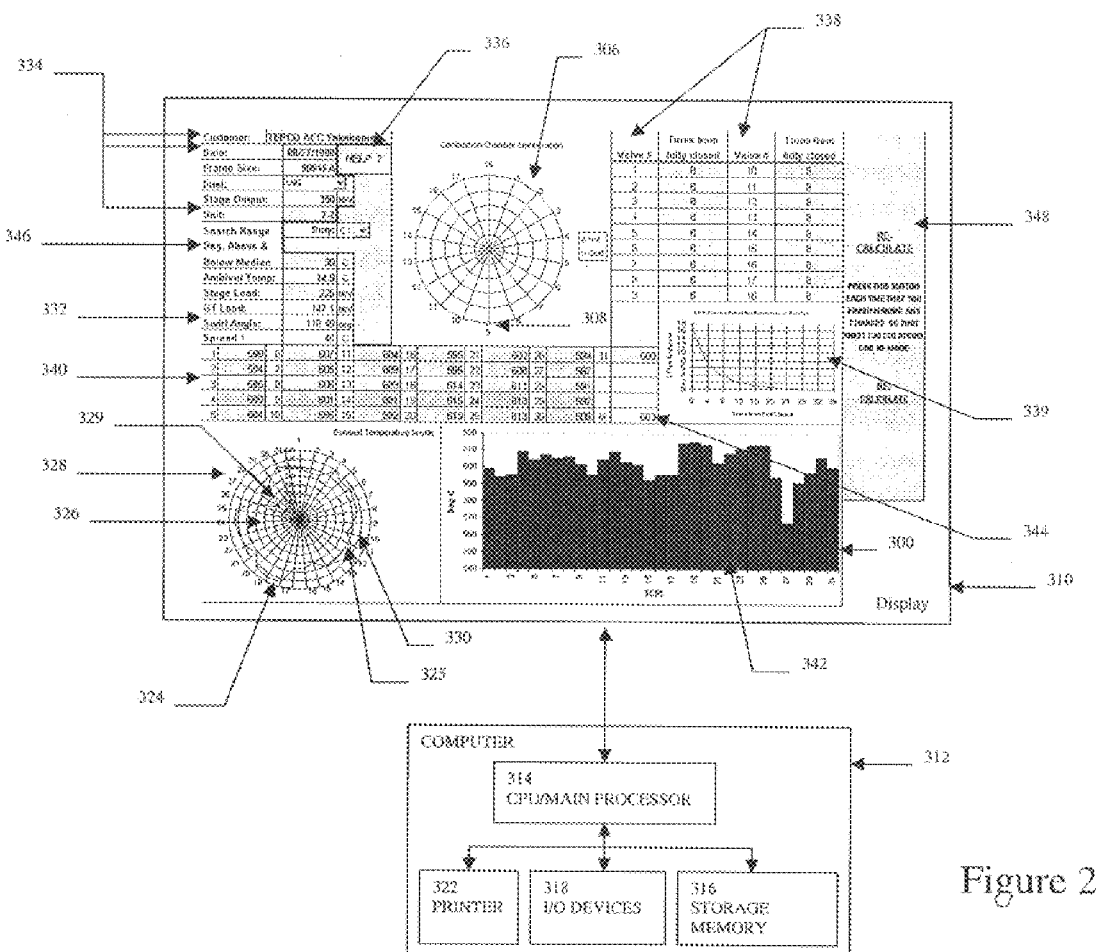
FIG. 2 is an exemplary graphical screen display image showing combustion chamber information generated by the CCGA application, and a computer system for generating the screen display image.

A combustion chamber graphic analyzer (CCGA) may be embodied in a computer software application that presents data regarding the combustion process within a gas turbine in graphical format such as the combustion chamber performance graphic screen image 300 shown in FIG. 2. The screen display image 300 is a graphical presentation of information related to the performance of a gas turbine 10, shown in FIG. 1. The screen display image 300 provides information related to the combustion process within the gas turbine, and particularly regarding the performance of individual combustion chambers within the combustion section of the gas turbine.

The screen image presents a polar combustion chamber graph 306 that identifies each annular combustion chamber, e.g., chambers 1 through 18, and indicates whether any chamber is operating relatively hot or cold with respect to the other chambers. For example, in the polar graph 306, the "cold" combustion chamber 9 is indicated by a "circle" symbol 308. The CCGA has determined that chamber 9 is operating cold relative to the median combustion temperature. The screen image 300 presents other information that identifies the gas turbine, the current operating state of the gas turbine and other information which service personnel may find useful in identifying the gas turbine and evaluating its performance.

The screen image 300 may be presented on a computer display 310 such as a cathode ray tube (CRT), liquid crystal display (LCD), or other display used in association with a computer. The display 310 may be driven by a computer 312 which includes a processing unit (e.g., CPU) 314 that accesses a memory unit 316, e.g., RAM, ROM, hard drive, data base network server, and other company memory, to execute computer programs such as the Microsoft™ Excel spreadsheet program. In addition, the computer memory 316 may include data related to the gas turbine for generation of the screen display 300.

The computer 312 also includes input/output devices 318 such as a keyboard and mouse. The computer may also be coupled to a printer 322 for generating paper records of the combustion chamber performance analysis shown in screen display 300. The computer 312 may be an individual computer, such as a personal computer, or may be coupled to a network of computers such that the main processor 314 is on a physically different computer component than is, for example, the memory 316.

The CCGA may be implemented as a software application stored in the storage memory 316 and executed by the main processor 314 of the computer. The CCGA software application may be based on application platforms such as a conventional spreadsheet program.

For example, there may be thirty-one (31) thermocouples 321 positioned in a circular array around the turbine exhaust and in the stream of combustion gases. These thermocouples detect the temperature of the combustion gases in the exhaust duct. Based on the temperature readings from each thermocouple positioned circumferentially around the gas turbine exhaust, the CCGA generates an exhaust temperature profile 324 that graphically shows the distribution of exhaust gas temperatures 325. The exhaust temperature profile 324 is a polar graph having radial spokes 326 for each of the thermocouples 321 in the gas turbine exhaust. These radial spokes are numbered to identify the position of each of the thermocouples in the gas turbine exhaust. In addition, the exhaust temperature profile graph may include temperature rings 330 that are concentrically centered on the center of the graph, where each ring identifies a temperature, e.g., 590° C. (Celsius), of the gas turbine exhaust temperature.

The exhaust temperature profile 324 shows graphically whether an individual thermocouple temperature measurement, e.g., thermocouple 27 (328), is reading an exceptionally hot or cold temperature, relative to the temperatures detected by the other thermocouples. An extraordinary cold temperature is shown as being detected by thermocouple 27 (328). An exceptionally hot or cold temperature reading may indicate a problem in one or more combustion chambers of the gas turbine. Moreover, the distribution of temperatures around the turbine exhaust indicates whether an extraordinary temperature is isolated to one area of the exhaust, e.g., to just one combustion chamber, or extends around the entire exhaust profile, which would indicate a problem with multiple or all chambers. The exhaust temperature profile alone does not indicate which combustion chamber is experiencing problems. The effects of "swirl" are not accounted for with respect to the exhaust temperature profile.

To identify the combustion chamber that relates to an extraordinarily high or low exhaust gas temperature requires that the exhaust gas temperature profile be adjusted to compensate for the "swirl" of gases from the combustion section to the turbine exhaust. A "swirl angle" is calculated to determine the angular offset needed to align the exhaust temperature profile with the combustion chambers. The swirl angle, in general, refers to the amount of rotation which occurs in the hot gases flow as they pass from the combustion section of the gas turbine, through the turbine and to the exhaust duct where the array of thermocouples 321 measure the temperature profile of the gases.

Other information presented on the graphical screen 300 may include identification information 334, such as the customer which owns the gas turbine, the date on which the exhaust temperature profile was obtained, the gas turbine identification ("unit"). In addition, a help button icon 336 calls up from the storage memory 316 a user's manual for the CCGA.

The screen display 300 may also present the rated power output (e.g., stage output at 350 megawatts (MW)) and the type of fuel, such as liquidfied natural gas (LNG), on which the gas turbine is operating. Additional information presented in the screen display 300 includes the ambient temperature surrounding the gas turbine, the current operating load for the gas turbines, e.g., "stage load" 225 MW; the current power of the gas turbine, e.g., gas turbine load=147.1 MW; the fuel tuning valve setting 339 for the fuel supply inlet at each of the combustion chambers. For example, the screen display image 300 may show the tuning valve opening positioning, e.g., turns from fully closed, for each combustion chamber. A reference chart 339 may also be included that indicates the percentage flow restriction for the tuning valve turn position. Using the actual valve turn position and the chart 339, a service technician may determine the percentage flow restriction in the fuel inlet at each combustion chamber. Much of the technical information presented in screen image 300 is helpful to determine the exhaust temperature profile, swirl angle of the combustion gases and the relative temperature of the exhaust gasses at each thermocouple.

The CCGA output screen 300 may also present the exhaust temperature profile in formats other than a polar graph 324. For example, a table 340 shows the temperature, such as in degrees Celsius, that is being measured by each of the thermocouples 321. In addition, a bar chart 342 may be presented that shows the temperature for each thermocouple (TCPL) 321. The bar chart graphically shows temperatures being measured by an individual thermocouple in the exhaust thermocouple array 321, such as thermocouple 328. The median temperature (m) 344 of all temperatures measured by all of the thermocouples is shown in the table 340.

A gas turbine technician may view the screen display 300 to identify potential combustion chamber performance problems. By viewing the combustion chamber polar graph 306, the technician sees that combustion chamber 9 is highlighted with a "cold" icon 308 that indicates a relatively-low combustion temperature in that chamber. In addition, the CCGA may include other indicators of excessively hot or cold chambers, such as a chart showing exclusively hot or cold chambers, a control panel indicator identifying a problem combustion chamber, or an alarm triggered by the detection of a hot or cold chamber. The technician uses this information to schedule the next combustion chamber inspection (requiring a turbine shut-down) and to determine which chambers are to be inspected. In particular, the technician may schedule chamber 9 for inspection and order repair parts for that chamber before the gas turbine is shut down.

The designation of "hot" or "cold" combustion chambers in the combustion chamber graph 306 is used to identify those combustion chambers having a combustion chamber temperature which is substantially greater or substantially less than the mean exhaust temperature 344 as measured by all thermocouples. A threshold temperature difference 346 from the mean temperature is used to determine whether an individual thermocouple temperature reading is "hot" or "cold".

The threshold temperature difference 346 may be selected by the technician. In particular, the CCGA software enables the technician to set a threshold temperature difference to be used to indicate that a combustion chamber to be either hot or cold on the combustion chamber graph 306. The temperature difference 347 from mean temperature which justifies a hot or cold combustion chamber setting is indicated in the screen display 300 as a "search range degree above and below mean" 346. This "search range" is the threshold temperature difference setting used by the technician to identify combustion problems. The search range may be adjusted so that the technician may determine how hot or cold is a problem chamber, or whether a hot or cold chamber's adjacent chambers are also operating hot or cold, albeit to a lesser extent.

Figure 3:
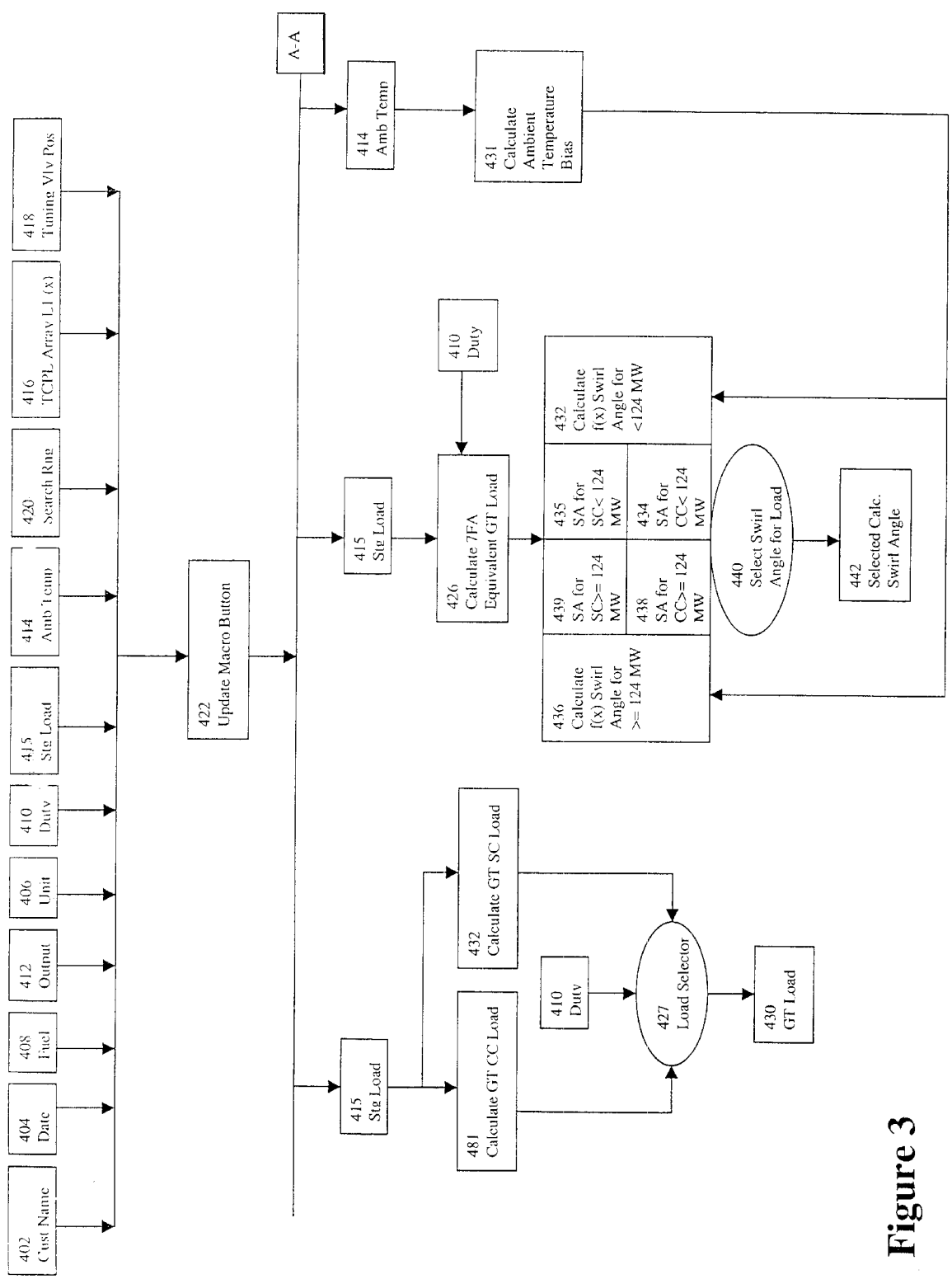
FIGS. 3 and 4 represent a flow chart for an exemplary CCGA software application.
Figure 4:
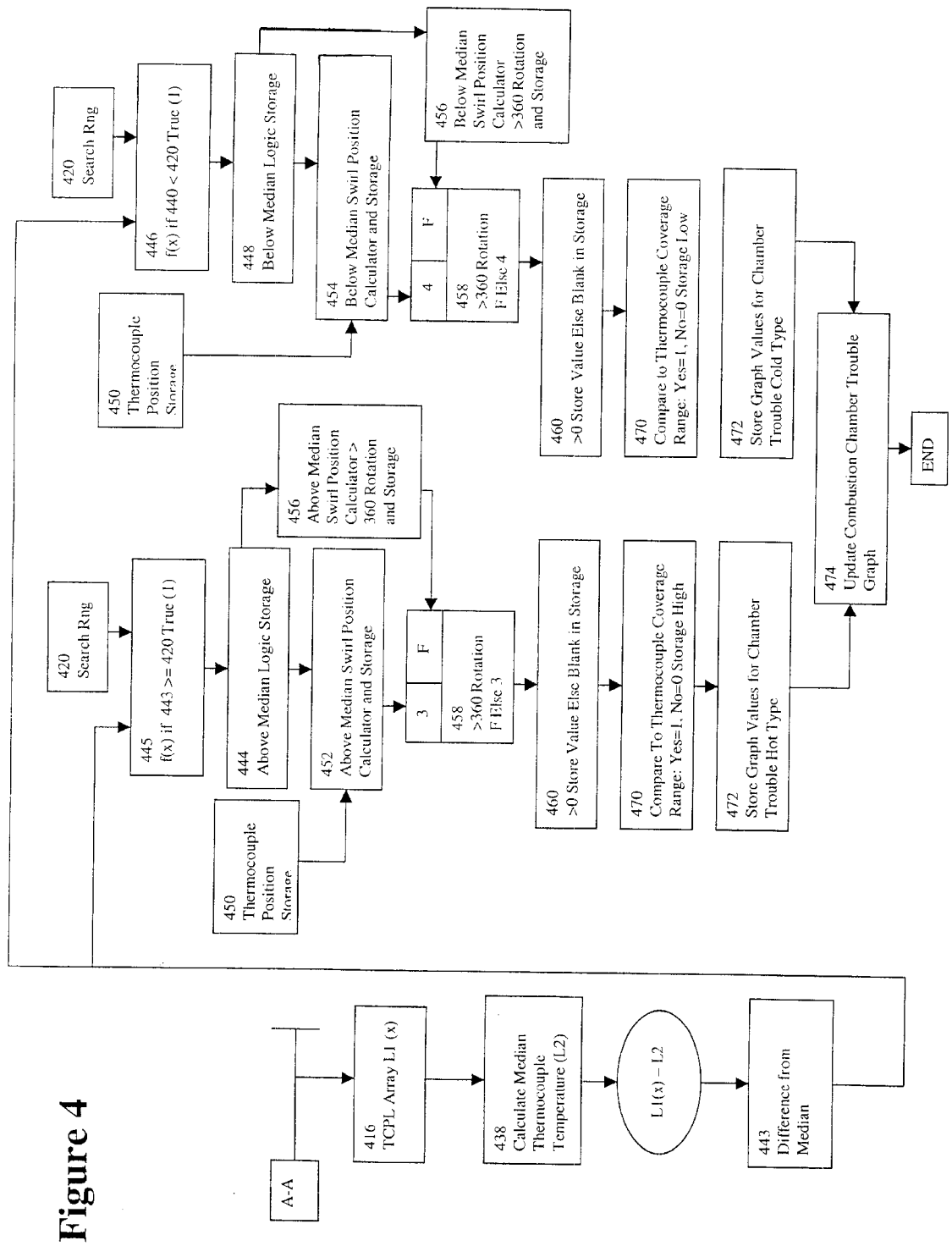

The combustion chamber temperature profile graph 306 may be charted again by the CCGA when an operator activates a recalculation button 348 on the screen display 300. Recalculation should be selected when the technician changes the temperature difference threshold 346, stage load, ambient temperature or after entering thermocouple data 340. FIGS. 3 and 4 show an exemplary software flowchart for the CCGA software application. The flowchart 400 describes the CCGA software application which generates the combustion performance screen display 300 in FIG. 2. The flowchart identifies information that is entered into the CCGA software application. This entered information is used by the CCGA software program to execute the algorithms used to determine whether excessive temperatures exist at the various locations measured in the exhaust gas stream, determine the swirl angle needed to correlate the exhaust gas temperatures with individual combustion chambers, and to plot profiles of the exhaust temperature and the combustion chamber temperatures.

Initially, information is entered into the computer 312 for use by the CCGA software. The entered information may include data such as the customer name 402, the date 404 on which the data entries are made, and information identifying 406 the specific gas turbine being analyzed. In addition, the type of fuel 408 being burned in the gas turbine may be entered, where the fuel may be liquid, gaseous, liquefied natural gas, synthetic gas, coal gas or a dual mixture fuel. Moreover, the duty cycle 410 of the system is identified as being a simple cycle (gas turbine only) or combined cycle (gas turbine and steam turbine) combined power generator.

The stage output 412 for the combined cycle or simple cycle system is identified in terms of the total rated capacity of either the gas turbine or the combined steam and gas turbine power generator.

Further, the ambient temperature 414 surrounding the gas turbine is entered manually by a service technician. Additional information inputted into the CCGA program include the data regarding thermocouples used in the thermocouple array and the turbine exhaust. The technician may directly enter data 418 regarding the tuning valve positions for the fuel supply to each of the combustion chambers.

Further, the service technician may enter a "search range" 420 which is a threshold temperature difference that is used by the CCGA software system to identify "hot" and "cold" combustion chambers in plotting the combustion chamber polar graph 306. This temperature difference is used by the CCGA software to search for maximum and minimum temperature variations from mean temperature 344 for each of the individual exhaust gas thermocouple temperature readings.

The input data is loaded into the CCGA software and stored. The newly-entered data is used to update and execute the four main program algorithms when the recalculate button 348 is activated. The CCGA software uses the stored information 410, 414, 415, 416 and 420 to calculate the swirl angle and other parameters needed to generate the screen display 300.

In step 481 and 432 (FIG. 3), the "gt cc" and "gt sc" loads are calculated respectively. These values are sent to load selector 427 and compared to duty 410. If the duty 410 is "cc", i.e., combined cycle, then the value of gt cc load 481 will be passed to gt load 430. If the duty 410 is sc, i.e., simple cycle, then the value of sc load 432 will be passed to gt load 430. The algorithms used by the CCGA are purposely linear for ease of programming. The equivalent gas turbine load for a combined cycle (CC) system is related to the stage load 415 as indicated by exemplary equation (1) below:

$$\text{CC Equivalent GT load} = [(\text{stage load}/1.4)/1.6667] \quad \text{(Equation 1)}$$

If the gas turbine is operating in a simple cycle (SC) system, then equation (2) may be used to determine the equivalent gas turbine load as follows:

$$\text{SC Equivalent GT load} = [\text{stage load}/1.6667] \quad \text{(Equation 2)}$$

The entered stage load 415 is used to calculate the 7FA equivalent gas turbine load 426. The term "7FA" refers to a class of gas turbines that is commonly used and has been used in the CCGA for purposes of describing this invention. The duty cycle 410 is also required to calculate the correct equivalent 7FA gt load 426. The duty cycle 410 determines whether cc or sc calculations will be performed. A 7FA equivalent load is used in this algorithm since the swirl calculation is based on a 7FA gas turbine. Since the 7FA and 9FA gas turbines (another class of turbines) are identical turbines with the exception that the 9FA is scaled proportionately to a larger size, the swirl calculator will work for the 9FA with the formulas that have been utilized in this application.

Ambient temperature 414 is entered into the ambient bias calculator 431.

The ambient temperature bias is determined in step 431 based on conversion equation (3), as follows:

$$\text{Amb. Temp. Bias} = [(20/17)*\text{ambient temperature} - 9.412] \quad \text{(Equ. 3)}$$

The ambient temperature bias is used to adjust the mass flow rate of the combustion gases flowing through the turbine to account for the ambient temperature of the inlet air to the gas turbine.

The swirl angle is applied to match the thermocouple array data to corresponding combustion chambers based on the 7FA equivalent gas turbine load 426. Moreover, the linear equations used for swirl angle are dependent on the particular gas turbines being evaluated. The equations may vary for different gas turbines. However, it is believed that a common set of equations can be developed for large classes of gas turbines and for turbines of a common manufacturer.

If the gas turbine is operating in combined cycle (CC) and the 7FA equivalent gas turbine load 426 is below a threshold level 432, e.g., below 124 MegaWatts (MW), then swirl angle calculation may be made using logical equation (4):

| | |
|---|---|
| Swirl Angle (434) = [Equation 4] | IF (((−8/6)*(CC Equivalent Load) + 253.33333)- ambient temp. bias is less than zero (0) IS TRUE THEN SWIRL ANGLE = (((−8/6)*(CC equivalent GT load) + 253.33333) + 360)-ambient temp. bias, AND IF FALSE THEN SWIRL ANGLE IS = ((−8/6)*(CC equivalent GT load) + 253.33333)-ambient temp. bias) |

For a gas turbine operating in a simple cycle (ss), where the gas turbine 7FA equivalent load 426 is below the threshold 432, e.g., 124 MW, the swirl angle calculation may be made using logical equation (5):

| | |
|---|---|
| Swirl Angle (435) = [Equation 5] | IF(((−8/6)*(SC Equivalent GT load) + 253.33333)- ambient temp. bias less than zero (0), IS TRUE THEN SWIRL ANGLE = (((−8/6)*(SC equivalent GT load) + 253.33333) + 360)-ambient temp. bias, AND IF FALSE THEN SWIRL ANGLE = ((−8/6)*(SC equivalent GT load) + 253.33333)-ambient temp. bias) |

For gas turbines having a load of greater than the threshold level 436, e.g., greater than 124 MW, the swirl angle calculation may be made for combined cycle systems using logical equation (6):

| | |
|---|---|
| Swirl Angle (438) = [Equation 6] | IF (((−6/7)*(CC Equivalent Load) + 207.1429)- ambient temp. bias is less than zero (0), IS TRUE THEN SWIRL ANGLE = (((−6/7)*(CC equivalent GT load) + 207.1429) + 360)-ambient temp. bias, IS FALSE THEN SWIRL ANGLE = ((−6/7)*(CC equivalent GT load) + 207.1429)-ambient temp. bias) |

For gas turbines having a load of greater than the threshold level 436, e.g., greater than 124 MW, the swirl angle calculation may be made for a simple cycle system using logical equation (7):

| | |
|---|---|
| Swirl Angle (439) = [Equation 7] | IF (((−6/7)*(SC Equivalent Load) + 207.1429)- ambient temp. bias is less than zero (0), IS TRUE THEN SWIRL ANGLE = (((−6/7)*(SC equivalent GT load) + 207.1429) + 360)-ambient temp. bias, IS FALSE THEN SWIRL ANGLE = ((−6/7)*(SC equivalent GT load) + 207.1429)-ambient temp. bias) |

To select 440 the proper swirl angle 442 from those determined using equations 4, 5, 6 and 7, the CCGA software applies the logical function expressed in equation (8):

| | |
|---|---|
| Swirl Angle Select (440): [Equation 8] | FOR COMBINED CYCLE SYSTEMS: (IF((CC equivalent GT load) is less than 124 MW, IS TRUE THEN USE EQUATION 4 (for swirl angle 434 applicable to a GT load less than 124 MW CC), IS FALSE THEN USE EQUATION 6 (for swirl angle 438 applicable to GT loads greater or equal to 124 MW CC))), FOR SIMPLE CYCLE SYSTEMS: (IF((SC equivalent GT load) is less than 124 MW, IS TRUE THEN USE EQUATION 5 (for swirl angle 435 applicable to a GT load less than 124 MW SC), IS FALSE THEN USE EQUATION 7 (for swirl angle 439 applicable to GT load greater or equal to 124 MW SC))). |

The selected swirl angle 442 is stored in the memory for later use to correlate the exhaust thermocouple temperature readings to individual combustion chambers.

The median temperature 344, of all exhaust gas temperatures measured by the array of thermocouples is determined using equation (9):

| | | |
|---|---|---|
| Temp. Med. = | MEDIAN(determine median temperature of all of the updated thermocouple data) | Equation (9) |

The median temperature is determined by selecting the center temperature at which there are as many thermocouple temperature readings that are hotter than the center as there are readings that are cooler than the center.

The temperature deviation from the median temperature 344 is determined, in step 443 for each of the temperatures as measured by each thermocouple in the array. The temperature from median for each thermocouple difference indicates a hot spot (if there is a positive temperature difference) or a cold spot (if the temperature difference is negative) in the exhaust gases of the gas turbine. These temperature difference values are stored in computer memory.

To determine whether any of the thermocouples are measuring an excessively high or low exhaust temperature, the temperature difference from median for each thermocouple is compared to a threshold temperature difference value 420, which has been selected 346 by gas turbine technician evaluating combustor performance. In step 470, If the difference between a thermocouple temperature measurement and the median temperature is the same as or exceeds the threshold value 347, then a flag, e.g., logic value one (1), is stored 472 to identify the thermocouple reading that is excessively hot or cold. In step 470, if the difference from median temperature is less than the threshold value, then no flag is stored, in step 472.

The position of each thermocouple in the array is correlated with a position in the combustion section by applying a swirl angle to the thermocouple position. The position of each of thermocouple is obtained from memory storage, in step 450. The swirl angle is applied to each of the thermocouple positions, in step 452, for those thermocouples measuring an temperature that is above or below the median temperature by at least the threshold difference level. Similarly, the swirl angle is applied to the position of those thermocouples measuring temperatures that vary from the median temperature by less than the temperature difference, in step 454.

The sum of the thermocouple position and swirl angle represents the position in the combustion section of-the hot gases that flow over the thermocouple. To plot the sum of the thermocouple position and swirl angle, it is useful that that sum (reduced by 360° if needed) is between 0° and 360°. If the swirl angle plus the thermocouple position exceeds 360° (step 456), then the sum of the swirl angle and thermocouple position is reduced by 360° (step 458). The position of the sum of the thermocouple and swirl angle can be stored (step 460) for later plotting on the combustion chamber chart 306.

The combustion chamber polar graph 306 is plotted 474 to identify those chambers that appear to be operating at temperatures different from the mean temperature by more than the threshold difference. The CCGA stores the corresponding chamber position (based on the applicable swirl angle) for each thermocouple that is reading an excessively hot or cold temperature. Whether a temperature is excessive depends on whether the temperature measured by the one thermocouple as compared to the median temperature exceeds the threshold temperature difference. If this difference is exceeded, then the chamber position corresponding to the excessive temperature reading is stored in computer memory and plotted on the chamber polar plot as being "hot" or "cold" 308. The threshold difference can be varied and the chamber temperature polar chart re-plotted to provide an indication of how much hotter or colder the chambers are as compared to the median temperature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of identifying an abnormal combustion temperature in an operating gas turbine comprising the steps of:

a. operating a gas turbine having a compressor, a combustion section, and a turbine, such that hot combustion gases generated in the combustion section flow through the turbine and exit the turbine as exhaust gases;

b. measuring temperatures of the exhaust gases at a plurality of positions arranged downstream of the turbine;

c. identifying at least one of the measured exhaust gas temperatures as an abnormal exhaust gas temperature;

d. correlating the at least one abnormal exhaust gas temperature with a corresponding location in the combustion section, wherein the correlation of the exhaust gas temperature with the combustion section is based on at least one linear function of a power output of the gas turbine and an ambient temperature bias, and e. identifying the corresponding location in the combustion section having the abnormal combustion gas temperature.

2. A method of identifying an abnormal combustion temperature in an operating gas turbine as in claim 1 wherein the combustion section includes an array of combustion chambers and step (e) further comprises displaying information identifying a combustion chamber corresponding to the location in the combustion section having the abnormal combustion gas temperature.

3. A method of identifying an abnormal combustion temperature reaction in an operating gas turbine as in claim 1 wherein step (d) further comprises determining a swirl angle indicative of a degree of rotation experienced by the combustion gases flowing from the combustion section to the plurality of positions where exhaust gas temperatures are measured, and wherein the swirl angle is determined based on the at least one linear function.

4. A method of identifying an abnormally hot or cold combustion temperature in an operating gas turbine comprising the steps of:
   a. operating a gas turbine having a compressor, a plurality of combustion chambers arranged in a circumferential array, and a turbine, such that hot combustion gases generated in the combustion chambers flow through the turbine and exit the turbine as exhaust gases;
   b. measuring temperatures of the exhaust gases at a plurality of positions arranged circumferentially in the exhaust gases;
   c. identifying an abnormally hot or cold exhaust gas temperature as being a temperature that differs from a baseline temperature by a predetermined threshold temperature difference;
   d. correlating the abnormally hot or cold exhaust gas temperature with at least one corresponding combustion chamber, wherein the exhaust gas temperature correlated with the at least one combustion chamber is based on at least one linear function of power output of the gas turbine adjusted for ambient temperature, and
   e. identifying the at least one of the combustion chamber as corresponding to the abnormally hot or cold exhaust gas temperatures.

5. A method of identifying an abnormally hot or cold combustion temperature in an operating gas turbine as in claim 4 wherein the step of correlating the abnormally hot or cold exhaust gas temperature with at least one of the corresponding the combustion chambers includes determining a swirl angle indicative of a degree of rotation experienced by the combustion gases flowing from the combustion chambers to the plurality of positions where exhaust gas temperatures are measured, and said swirl angle is based on the at least one linear function.

6. A method of identifying an abnormally hot or cold combustion temperature in an operating gas turbine as in claim 4 wherein the baseline temperature is a median temperature of the measured temperatures.

7. A method of identifying an abnormally hot or cold combustion temperature in an operating gas turbine as in claim 4 further comprising periodically repeating steps (b) to (e).

8. A method of identifying an abnormally hot or cold combustion temperature in an operating gas turbine as in claim 4 further comprising repeating steps (b) to (e) after changing the predetermined threshold difference.

9. A method of identifying an abnormally hot or cold combustion reaction in a gas turbine as in claim 4 further comprising generating a presentation of exhaust gas temperatures.

10. A method of identifying an abnormally hot or cold combustion temperature in a gas turbine as in claim 4 wherein the correlation of the exhaust gas temperature with the corresponding at least one of the combustion chambers is performed with a linear correlation algorithm.

11. A method of identifying an abnormal combustion temperature In an operating gas turbine as in claim 1 wherein the at least one linear function includes a constant multiplier applied to the power output and is adjusted by an ambient air temperature bias.

12. A method of identifying an abnormal combustion temperature in an operating gas turbine as in claim 1 wherein the at least one linear function includes an ambient air temperature bias which is subtracted from a constant multiplied by the power output.

13. A method of identifying an abnormal combustion temperature in an operating gas turbine as in claim 1 wherein the at least one linear function is a plurality of linear functions, and a one of the plurality of linear functions is selected to correlate the exhaust gas temperature with the combustion section.

14. A method of identifying an abnormal combustion temperature in an operating gas turbine as in claim 13 wherein the selection of the one of the plurality of linear functions is based in part on a threshold gas turbine output.

15. A method of identifying an abnormal combustion temperature in an operating gas turbine as in claim 13 wherein the selection of the one of the plurality of linear functions is based in part on whether the gas turbine is in a combined cycle system or a single cycle system.

* * * * *

UNITED STATES PATENT AND TRADEMARK OFFICE
CERTIFICATE OF CORRECTION

PATENT NO. : 6,460,346 B1
DATED : October 8, 2002
INVENTOR(S) : Cleary

It is certified that error appears in the above-identified patent and that said Letters Patent is hereby corrected as shown below:

<u>Column 3,</u>
Line 45, kindly delete "FIG. 1 a" and insert -- FIG. 1 is a -- therefor.

<u>Column 12,</u>
Line 16, kindly delete "In" and insert -- in -- therefor.

Signed and Sealed this

Eleventh Day of February, 2003

JAMES E. ROGAN
*Director of the United States Patent and Trademark Office*